US011062373B2

(12) United States Patent
Reynolds et al.

(10) Patent No.: US 11,062,373 B2
(45) Date of Patent: Jul. 13, 2021

(54) SYSTEMS AND METHODS FOR COLOR COORDINATION OF SCANNED PRODUCTS

(71) Applicant: Behr Process Corporation, Santa Ana, CA (US)

(72) Inventors: Damien Reynolds, Huntington Beach, CA (US); Douglas Milsom, Tacoma, WA (US); Cecelia Wren, Albany, NY (US)

(73) Assignee: Behr Process Corporation, Santa Ana, CA (US)

( * ) Notice: Subject to any disclaimer, the term of this patent is extended or adjusted under 35 U.S.C. 154(b) by 294 days.

(21) Appl. No.: 15/970,223

(22) Filed: May 3, 2018

(65) Prior Publication Data

US 2018/0330421 A1 Nov. 15, 2018

Related U.S. Application Data

(60) Provisional application No. 62/504,004, filed on May 10, 2017.

(51) Int. Cl.
*G06Q 30/00* (2012.01)
*G06Q 30/06* (2012.01)
*G06K 7/14* (2006.01)

(52) U.S. Cl.
CPC ....... *G06Q 30/0627* (2013.01); *G06K 7/1413* (2013.01); *G06K 7/1417* (2013.01); *G06Q 30/0629* (2013.01)

(58) Field of Classification Search
CPC ... G06Q 30/0601–0645; G06K 7/1413; G06K 7/1417

(Continued)

(56) References Cited

U.S. PATENT DOCUMENTS 7,230,629 B2 6/2007 Reynolds et al.
9,530,163 B2 12/2016 Buzyn et al.
(Continued)

OTHER PUBLICATIONS

Liu, Chao. "Using Virtual Reality to Improve Design Communication." Order No. MR83582 University of Calgary (Canada), 2012. Ann Arbor: ProQuest. Web. Feb. 4, 2021. (Year: 2012).*

(Continued)

*Primary Examiner* — Resha Desai
*Assistant Examiner* — Kennedy Gibson-Wynn
(74) *Attorney, Agent, or Firm* — Harness, Dickey & Pierce, P.L.C.

(57) ABSTRACT

Systems and methods for color coordination for scanned products are provided. A kiosk has a control module, an input device, a display device, and an optical code reader. The kiosk has access to a product/color database. The control module is configured to receive an identification code scanned by the optical code reader, determine a sample product associated with the identification code, determine at least one coordinating color for the sample product based on the product/color database, display a simulated environment including a sample room having at least one selectable surface, display on the display device the at least one coordinating color, receive with the input device a selected color, receive with the input device a selected surface from the sample room, display on the display device the simulated environment showing the sample room with the sample product and with the selected color on the selected surface of the sample room.

12 Claims, 7 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 9,857,888 | B2 | 1/2018 | Reynolds et al. |
| 10,296,969 | B2 | 5/2019 | Hamacher et al. |
| 2002/0184232 | A1 | 12/2002 | Menner et al. |
| 2005/0099630 | A1 | 5/2005 | Reynolds et al. |
| 2006/0237532 | A1* | 10/2006 | Scott-Leikach ........... G07F 7/02 235/383 |
| 2007/0282695 | A1* | 12/2007 | Toper ................. G06Q 30/0635 705/26.81 |
| 2012/0170840 | A1 | 7/2012 | Caruso et al. |
| 2012/0209748 | A1* | 8/2012 | Small ..................... G06Q 30/06 705/27.1 |
| 2012/0259743 | A1* | 10/2012 | Pate, Jr. ................. G06Q 30/00 705/27.2 |
| 2014/0019310 | A1* | 1/2014 | Hong ................. G06Q 30/0641 705/27.2 |
| 2015/0371309 | A1 | 12/2015 | Buzyn et al. |
| 2016/0180450 | A1 | 6/2016 | Hamacher et al. |
| 2016/0275702 | A1 | 9/2016 | Reynolds et al. |
| 2017/0132694 | A1* | 5/2017 | Damy .................. G06F 3/0488 |
| 2018/0158123 | A1* | 6/2018 | Caruso ............... G06Q 30/0621 |
| 2019/0138168 | A1 | 5/2019 | Vickers et al. |

OTHER PUBLICATIONS

U.S. Appl. No. 16/413,819, filed May 16, 2019, Leonard Ludovic Hamacher.
First Office Action regarding Chilean Patent Application No. 201801256, dated Jun. 3, 2019. Translation provided by Clarke Modet & Co.

* cited by examiner

FIG - 5B

SYSTEMS AND METHODS FOR COLOR COORDINATION OF SCANNED PRODUCTS

CROSS-REFERENCE TO RELATED APPLICATIONS

This application claims the benefit of U.S. Provisional Application 62/504,004, filed on May 10, 2017. The entire disclosure of the above application is incorporated herein by reference.

FIELD

The present disclosure relates to color coordination and, more particularly, to color coordination of paint colors with a non-paint product identified using an optical code reader.

BACKGROUND

This section provides background information related to the present disclosure, which is not necessarily prior art.

Retail stores that sell coating products, such as paints and stains, often sell other products for interior design and decoration, such as carpet, flooring, window treatments, lighting fixtures, other fixtures, furniture, decorations, and other items located within an interior of a building, such as a home or commercial space. For a particular project, a consumer may first select one of the other products for interior design and decoration and then look for matching or coordinating paint colors that go with the selected product. The consumer, however, may be unsure as to which paint colors match or coordinate with the selected product and, as a result, may limit their paint color selection.

Consumers may browse and select particular colors electronically using, for example, a kiosk, a website, a website application, a mobile application, etc. For example, a color selection and coordination system that allows a user to select a starting color and that provides coordinating colors for the starting color is described in U.S. Pat. No. 7,230,629, "Data-driven color coordinator," which is incorporated herein by reference. For further example, an automated method and apparatus for providing color selection capability is described in U.S. Pat. No. 9,530,163, "Automated Color Selection Method and Apparatus," which is also incorporated herein by reference.

SUMMARY

This section provides a general summary of the disclosure, and is not a comprehensive disclosure of its full scope or all of its features.

The present disclosure provides a system comprising a kiosk having a control module, an input device, a display device, and an optical code reader, and having access to a product/color database. The control module is configured to receive an identification code scanned by the optical code reader, determine a sample product associated with the identification code, determine at least one coordinating color for the sample product based on the product/color database, display on the display device a simulated environment including a sample room having at least one selectable surface, display on the display device the at least one coordinating color, receive with the input device a selected color from the at least one coordinating color, receive with the input device a selected surface from the sample room, display on the display device the simulated environment showing the sample room with the sample product and with the selected color on the selected surface of the sample room.

In some configurations, the sample product is a carpet sample.

In some configurations, the sample product is one of a flooring, a window treatment, a lighting fixtures, a room fixtures, a piece of furniture, and a room decoration.

In some configurations, the identification code is one of a barcode and a QR code.

In some configurations, the system further comprises a touchscreen device that includes the input device and the display device.

In another form, the present disclosure provides a method that includes receiving, with a control module of a kiosk, an identification code scanned by an optical code reader. The method also includes determining, with the control module, a sample product associated with the identification code. The method also includes determining, with the control module, at least one coordinating color for the sample product based on a product/color database accessible to the control module. The method also includes displaying, on a display device of the kiosk, a simulated environment including a sample room having at least one selectable surface. The method also includes displaying, on the display device, the at least one coordinating color. The method also includes receiving, with an input device of the kiosk, a selected color from the at least one coordinating color. The method also includes receiving, with the input device, a selected surface from the sample room. The method also includes displaying, on the display device, the simulated environment showing the sample room with the sample product and with the selected color on the selected surface of the sample room.

In some configurations, the sample product is a carpet sample.

In some configurations, the sample product is one of a flooring, a window treatment, a lighting fixtures, a room fixtures, a piece of furniture, and a room decoration.

In some configurations, the identification code is one of a barcode and a QR code.

In some configurations, the input device and the display device are integrated into a touchscreen device.

In another form, the present disclosure provides a system comprising a mobile device having a touchscreen and a camera and having access to a product/color database. The mobile device is configured to receive an identification code scanned by the camera, determine a sample product associated with the identification code, determine at least one coordinating color for the sample product based on the product/color database, display on the touchscreen a simulated environment including a sample room having at least one selectable surface, display on the touchscreen the at least one coordinating color, receive with the touchscreen a selected color from the at least one coordinating color, receive with the touchscreen a selected surface from the sample room, display on the touchscreen the simulated environment showing the sample room with the sample product and with the selected color on the selected surface of the sample room.

In some configurations, the sample product is a carpet sample.

In some configurations, the sample product is one of a flooring, a window treatment, a lighting fixtures, a room fixtures, a piece of furniture, and a room decoration.

In some configurations, the identification code is one of a barcode and a QR code.

In some configurations, the mobile device is configured with a mobile application that includes the product/color database.

In another form, the present disclosure provides a method that includes receiving, with a mobile device having access to a product/color database, an identification code scanned by a camera of the mobile device. The method also includes determining, with the mobile device, a sample product associated with the identification code. The method also includes determining, with the mobile device, at least one coordinating color for the sample product based on the product/color database. The method also includes displaying, on a touchscreen of the mobile device, a simulated environment including a sample room having at least one selectable surface. The method also includes displaying, on the touchscreen, the at least one coordinating color. The method also includes receiving, with the touchscreen, a selected color from the at least one coordinating color. The method also includes receiving, with the touchscreen, a selected surface from the sample room. The method also includes displaying, on the touchscreen, the simulated environment showing the sample room with the sample product and with the selected color on the selected surface of the sample room.

In some configurations, the sample product is a carpet sample.

In some configurations, the sample product is one of a flooring, a window treatment, a lighting fixtures, a room fixtures, a piece of furniture, and a room decoration.

In some configurations, the identification code is one of a barcode and a QR code.

In some configurations, the mobile device is configured with a mobile application that includes the product/color database.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A and 5B illustrate a perspective view of a mobile device and a screenshot of a color coordination system for scanned products according to the present disclosure.

Corresponding reference numerals indicate corresponding parts throughout the several views of the drawings.

DETAILED DESCRIPTION

Example embodiments will now be described more fully with reference to the accompanying drawings.

The present disclosure includes color coordination systems and methods that allow a user to scan a barcode of a selected non-paint product, such as a carpet sample or other product, using a barcode reader or a camera of a mobile device. The color coordination system then accesses a lookup table in a product/color database and retrieves a predetermined set of coordinating or matching paint colors for the scanned product. The color coordination system displays the predetermined set of coordinating or matching paint colors, with associated identification information, such as color names and/or color codes, for the user to view. The color coordination system can also display a simulated environment showing a sample room, for example, with the scanned product. For example, if the scanned product is a carpet sample, the simulated environment can include the sample room shown carpeted with the carpet associated with the scanned carpet sample. The color coordination system can also display the predetermined set of coordinating or matching paint colors and can allow the user to select one or more particular paint colors from the predetermined set of coordinating or matching paint colors along with selectable surfaces of the sample room shown in the simulated environment. The color coordination system can then display the simulated environment showing selected paint colors on the selected surfaces of the sample room while continuing to display the selected carpet in the sample room. In this way, the user can see the simulated environment with the scanned product, such as the scanned carpet, along with a number of predetermined coordinating and/or matching paint color options for the room. In this way, the user is provided with a number of paint color coordination and matching options for a particular scanned product, such as a carpet sample, and can confidently purchase paint colors for a particular interior project that coordinate or match with the particular scanned product.

Figure 1:
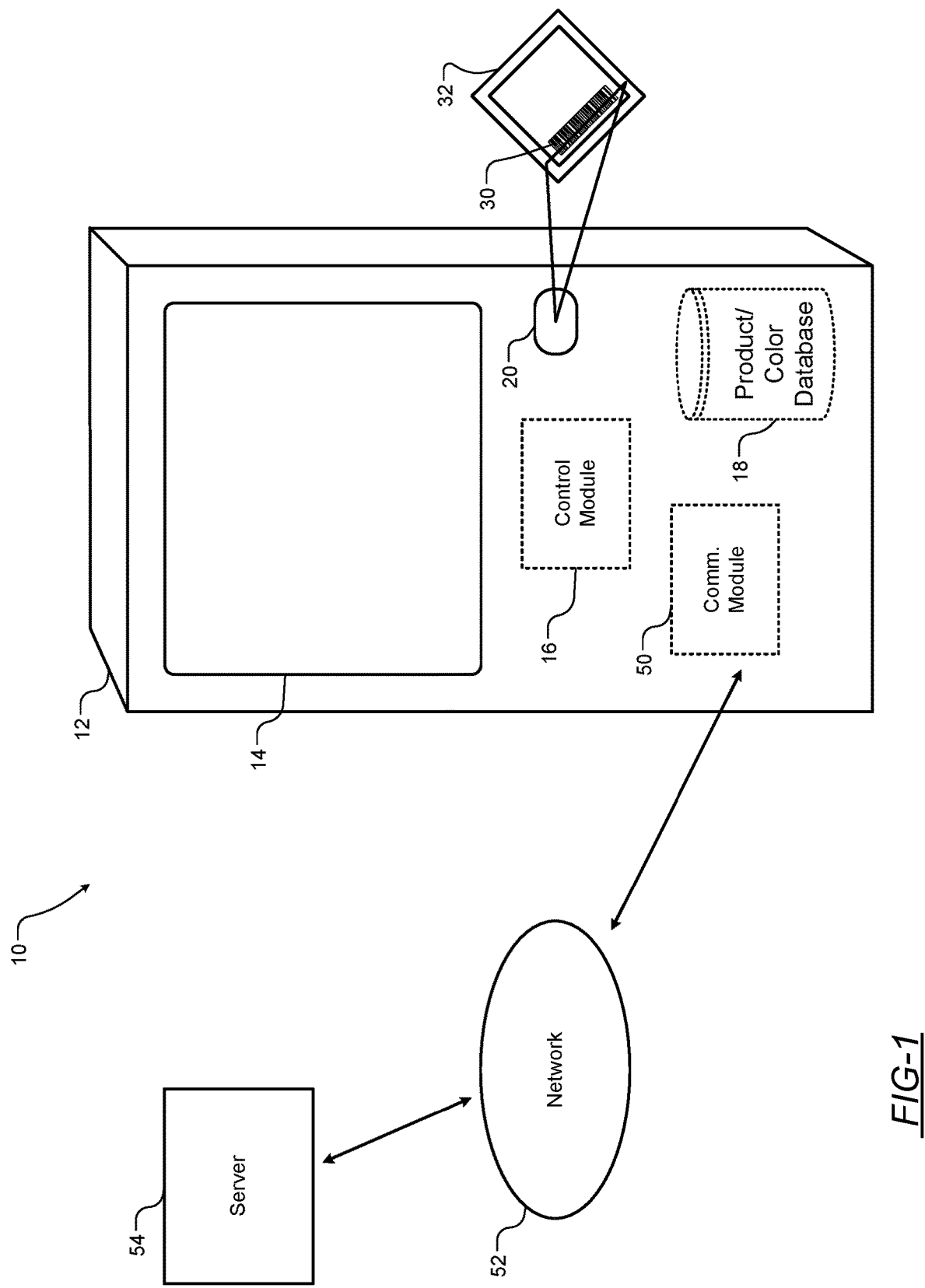
FIG. 1 is a block diagram of a color coordination system for scanned products according to the present disclosure.

With reference to FIG. 1, a block diagram of a color coordination system 10 for scanned products according to the present disclosure is shown. In the example shown in FIG. 1, the color coordination system 10 includes a kiosk 12 having a touchscreen input/output device 14. Although the example of FIG. 1 shows a touchscreen input/output device 14, separate input and output devices may be used. For example, the kiosk 12 may include a monitor with an output display screen and separate keyboard and mouse input devices. The kiosk 12 includes a control module 16 that is in communication with the touchscreen input/output device 14, a product/color database 18, and an optical code reader 20. The control module 16 receives input from the touchscreen input/output device 14 and controls a display output on the touchscreen input/output device 14 in accordance with the present disclosure, as discussed in further detail below. The kiosk 12 can be located with a retail store that sells, for example, paint products along with non-paint products, such as carpet, flooring, window treatments, lighting fixtures, other fixtures, furniture, decorations, and other home improvement items.

The optical code reader 20 can scan and receive a machine-readable optical code associated with scanned products, such as carpet samples, flooring samples, window treatments, lighting fixtures, other fixtures, furniture, decorations, and other items for sale within the retail store. The machine-readable optical code may be, for example, a barcode, a Quick Response (QR) code (i.e., a two-dimensional barcode), or an alphanumeric code associated with and used for identifying the particular scanned product. While the present disclosure provides examples of a barcode, a QR code, and an alphanumeric code, other suitable machine-readable optical codes may be used. The machine-readable optical code may uniquely identify an associated product.

Figure 3A:
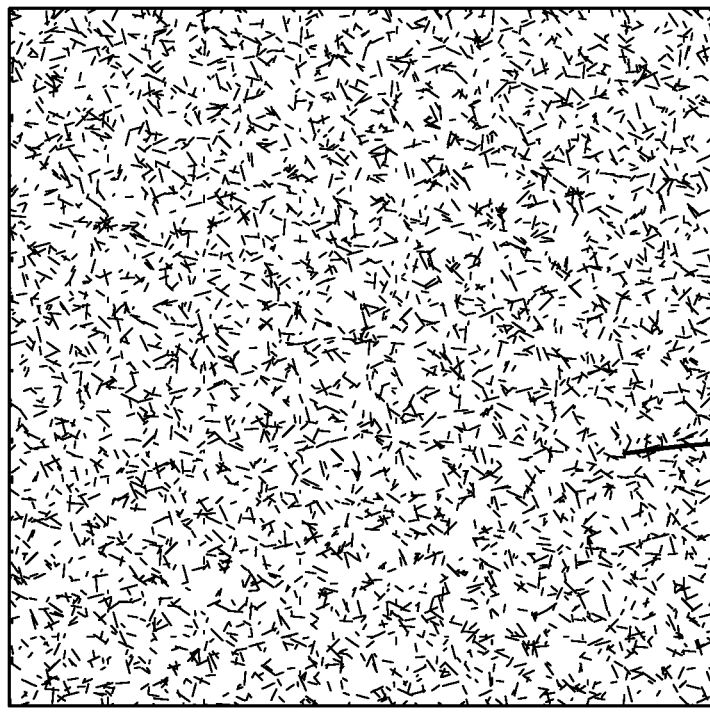
FIGS. 3A and 3B illustrate a product sample and, in particular, a carpet product sample with an optical identification code.
Figure 3B:
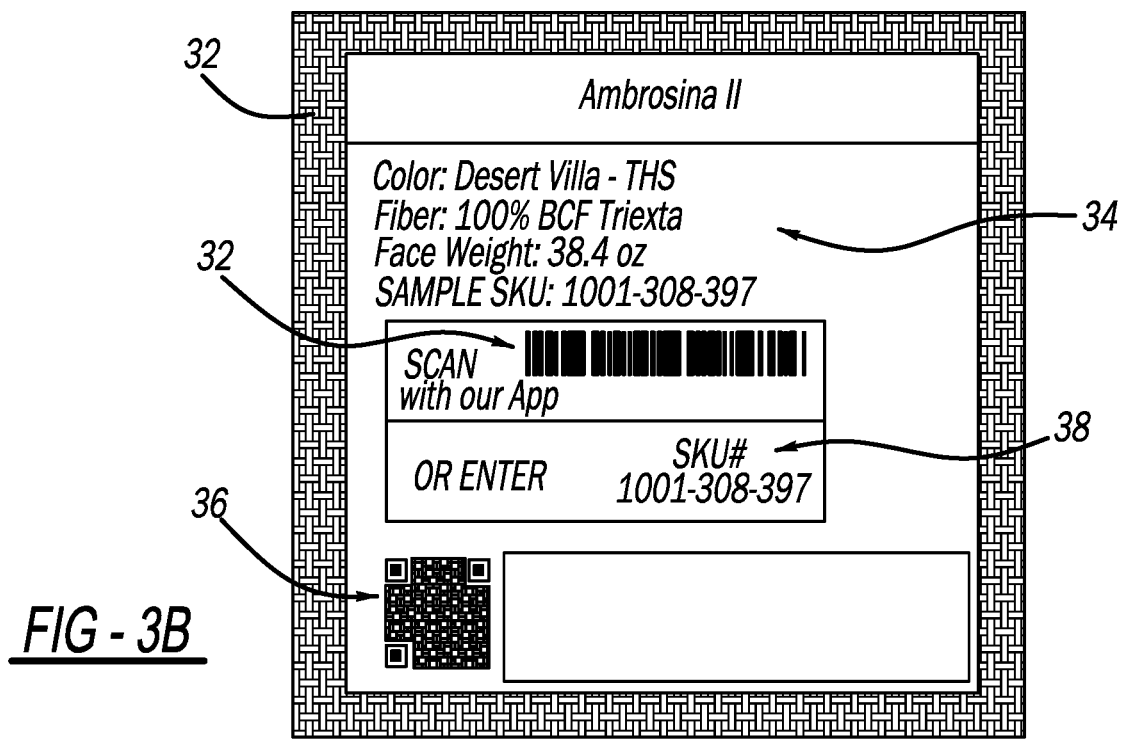

As shown in the example of FIG. 1, the optical code reader 20 can be used to scan a barcode 30 of a sample product. In the example of FIG. 1, the sample product is a carpet sample 32, which is shown in further detail in FIGS. 3A and 3B. With reference to FIG. 3A, a front side of the carpet sample 32 is shown and includes an actual sample square of the carpet. With reference to FIG. 3B, a back side of the carpet sample 32 is shown. The back side includes the barcode 30. The backside also includes associated information 34 of the carpet sample 32, including, for example, a name and a color of the carpet, a fiber of the carpet, and a face weight of the carpet. In the example of FIG. 3B, the name of the carpet is "Ambrosina II," the color of the carpet is "Desert Villa—THS," the fiber of the carpet is "100% BCF Triexta," and the face weight of the carpet is "38.4 oz." In the example of FIG. 3B, the backside of the carpet sample 32 also includes a QR code 36 and a Stock Keeping Unit (SKU) number 38. While the example of FIGS. 3A and 3B includes a carpet sample 32, any other sample product can be used, including, for example, other types of flooring or floor coverings, window treatments, lighting fixtures, other fixtures, furniture, decorations, and other items located within an interior of a building.

With reference again to FIG. 1, the optical code reader 20 of the kiosk 12 can scan the barcode 30 of the sample product, such as the carpet sample 32. The control module 16 receives the barcode 30 associated with the sample product and accesses the product/color database 18 to lookup the sample product. The product/color database 18 can store information associated with multiple products. For each product stored, the product/color database 18 can include one or more matching or coordinating paint colors preselected for the particular sample product. In other words, the product/color database 18 can include a lookup table whereby the control module 16 can look up a particular sample product and can retrieve the one or more matching or coordinating paint colors that have been preselected for the particular sample product. For example, the product/color database 18 can include an Extensible Markup Language (XML) lookup table that includes particular products and associated preselected matching or coordinating paint colors for each of the particular products. In the example, of FIG. 1 the control module 16 can receive the barcode 30 of the carpet sample 32 and can then query the product/color database 18 for the entry corresponding to the carpet sample 32 associated with the scanned barcode 30. The control module 16 can then retrieve the one or more matching or coordinating paint colors that have been preselected for the carpet sample 32 for display and selection on the touchscreen input/output device 14, as discussed in further detail below.

While the examples provided above include scanning a machine-readable optical code, such as a barcode or QR code for a sample product, the user can alternatively enter an identification code, such as the SKU number associated with the sample product. For example, the user can type in the SKU number, or other alphanumeric identification information using the touchscreen input/output device 14.

With reference again to FIG. 1, the kiosk 12 also includes a communication module 50 in communication with a server 54 over a network 52. The network 52 may be a local area network (LAN) or a wide area network (WAN) such as the internet. The communication module 50 may include a suitable network connection for wired or wireless communication with the network 52. For example, the communication module 50 can include a suitable Ethernet connection for wired communication with a network router or suitable wireless transmitters, receivers, and/or transceivers for Wi-Fi or cellular communication with the network 52.

The server 54 may be a central server 54 that stores and deploys updates for the product/color database 18. The control module 16 of the kiosk 12 can communicate with the server 54 through the network 52 using the communication module 50 to receive updates to the product/color database 18. For example, the updates can include additional sample products and/or additional or different coordinating or matching colors for a particular product sample. The server 54 may be associated with an administrator for all retail stores with kiosks 12 according to the present disclosure. The server 54 can push out updates to the kiosks 12 at the various retail store locations and/or the control modules 16 of the various kiosks 12 can periodically check the server 54 for updates to the product/color database 18.

While the example of FIG. 1 is shown with the product/color database 18 located at or with the kiosk 12, alternatively the product/color database 18 can be located at the server 54. In such case, the control module 16 can access the product color database 18 located at the server 54 through communication with the server 54 over the network 52 and via the communication module 50.

Figure 2:
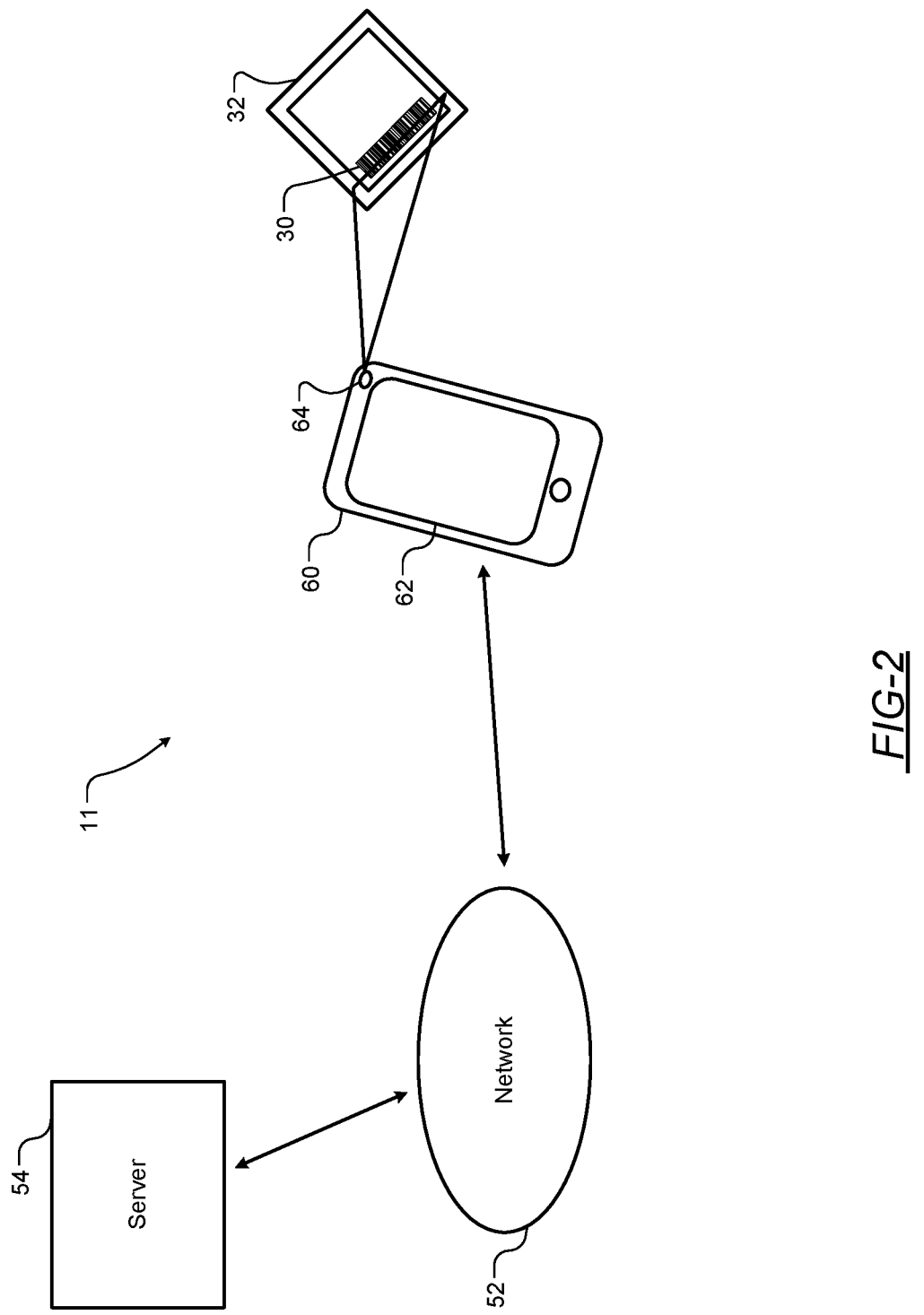
FIG. 2 is another block diagram of a color coordination system for scanned products according to the present disclosure.

With reference to FIG. 2, another block diagram of a color coordination system 11 for scanned products according to the present disclosure is shown. The color coordination system 11 of FIG. 2 is similar to the color coordination system 10 of FIG. 1, except that the color coordination system 11 of FIG. 2 includes a mobile device 60 instead of the kiosk 12. The mobile device 60 may be a smartphone, a tablet, or other suitable computing device. In the color coordination system 11 of FIG. 2, the mobile device 60 performs the functionality of the kiosk 12 described above with reference to FIG. 1. The mobile device 60 includes a touchscreen input/output device 62 and a camera 64. In the example of FIG. 2, the camera 64 can be used to scan the machine-readable optical code, such as the barcode 30, of the sample product, such as the carpet sample 32. In particular, the mobile device 60 can include a mobile application or app installed on the mobile device 60 to perform the functionality described in accordance with the present disclosure. For example, the mobile device 60 can use the camera 64 to take an image of the barcode 30 of the carpet sample 32. The mobile application can then scan the image to identify and recognize the barcode 30 within the image. The mobile application of the mobile device 60 can then access a product color database either stored on the mobile device 60 or stored at the server 54 to access and retrieve matching or coordinating colors for the sample product, e.g., the carpet sample 32, associated with the scanned barcode 30. For example, the mobile device 60 can communicate with the server 54 over the network 52 using a Wi-Fi or cellular data connection. The mobile device 60 can then display the sample product, e.g., the carpet sample 32, with the preselected matching or coordinating colors in a simulated environment including a sample room, as discussed in further detail below.

Figure 4:
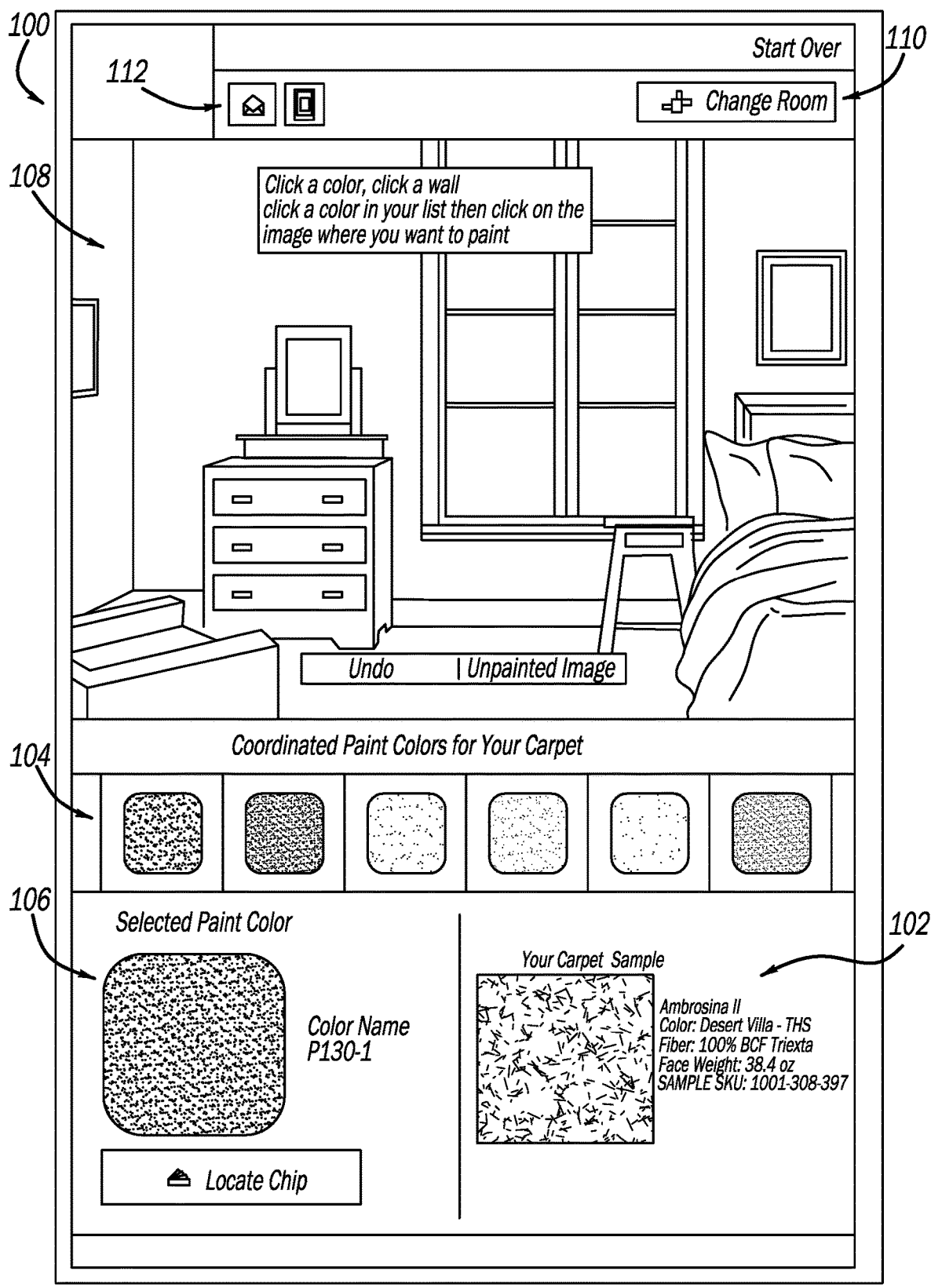
FIG. 4 illustrate a screenshot of a color coordination system for scanned products according to the present disclosure.

With reference to FIG. 4, a screenshot 100 of a color coordination system for scanned products is illustrated. The screenshot 100 can be displayed on the touchscreen input/output device 14 of the kiosk 12 shown in FIG. 1. Additionally or alternatively, the screenshot 100 can be displayed on the touchscreen input/output device 62 of the mobile device 60 shown in FIG. 2. The screenshot 100 illustrates a display including a sample product section 102 that shows the sample product previously scanned by optical code reader 20. Continuing with the example of the carpet sample 32 shown in FIGS. 1 to 3B, in FIG. 4 the sample product section shows an icon corresponding to the carpet sample, along with the associated information, such as the name of the carpet, the fiber, the face weight, the SKU, etc.

The screenshot 100 also includes a color selection section 104 that includes the preselected matching or coordinating colors from the product/color database 18 for the sample product displayed in the sample product section 102. The screenshot 100 also includes a selected color section 106 that displays a selected color from the color selection section 104 along with associated identification information, such as a color name and a color identification number. The selected color section 106 also includes a "Locate Chip" button. Selection of the "Locate Chip" button provides the user with instructions to locate a color chip associated with the selected color in the retail store.

The screenshot 100 also includes a simulated environment section 108 that displays a simulated environment with an image of a sample room that includes the selected product. For example, in the example of FIG. 4, the simulated environment displayed includes carpeting corresponding to the carpet sample displayed in the sample product section.

In addition, the simulated environment section 108 allows a user to select one or more surfaces, such as walls and/or trim, in the sample room to be displayed with one or more colors from the color selection section 104. In other words, the user can paint surfaces, such as walls and trim, of the sample room in the simulated environment with selected colors from the color selection section 104. In this way, the user can view a simulated environment that includes the scanned sample product, such as the carpet sample 32, in the sample room along with walls or trim painted with selected colors from the preselected set of matching or coordinating colors shown in the color selection section 104.

While the example of FIG. 4 shows a simulated environment with a bedroom as the sample room, any type of sample room can be used. For example, the user can select the "Change Room" button 110 and be provided with a different type of sample room, such as a kitchen, living room, dining room, bathroom, etc. Additionally or alternatively, the color coordination system 10, 11 may present the user with multiple types of rooms or multiple sample rooms within a particular room type and allow the user to select a particular type of room and/or a particular sample room within a room type.

Figure 5A:
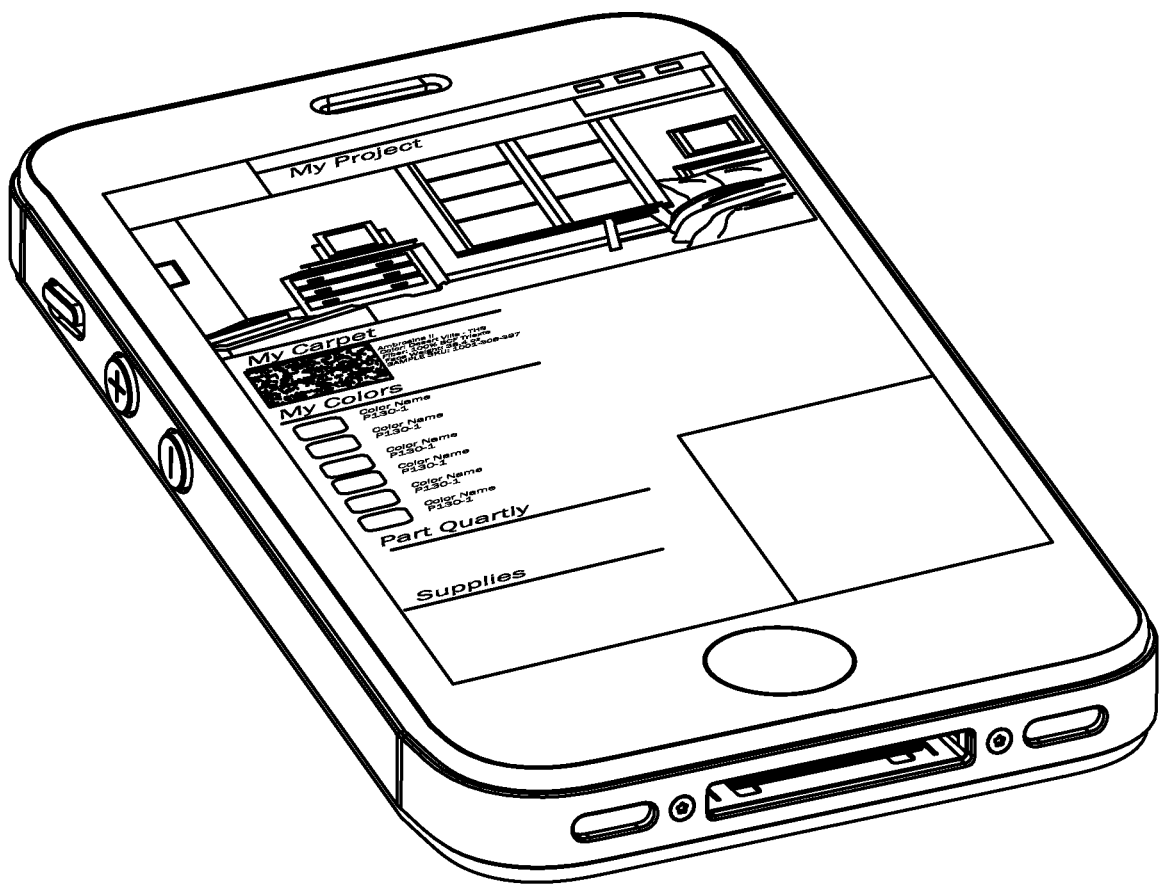
Figure 5B:
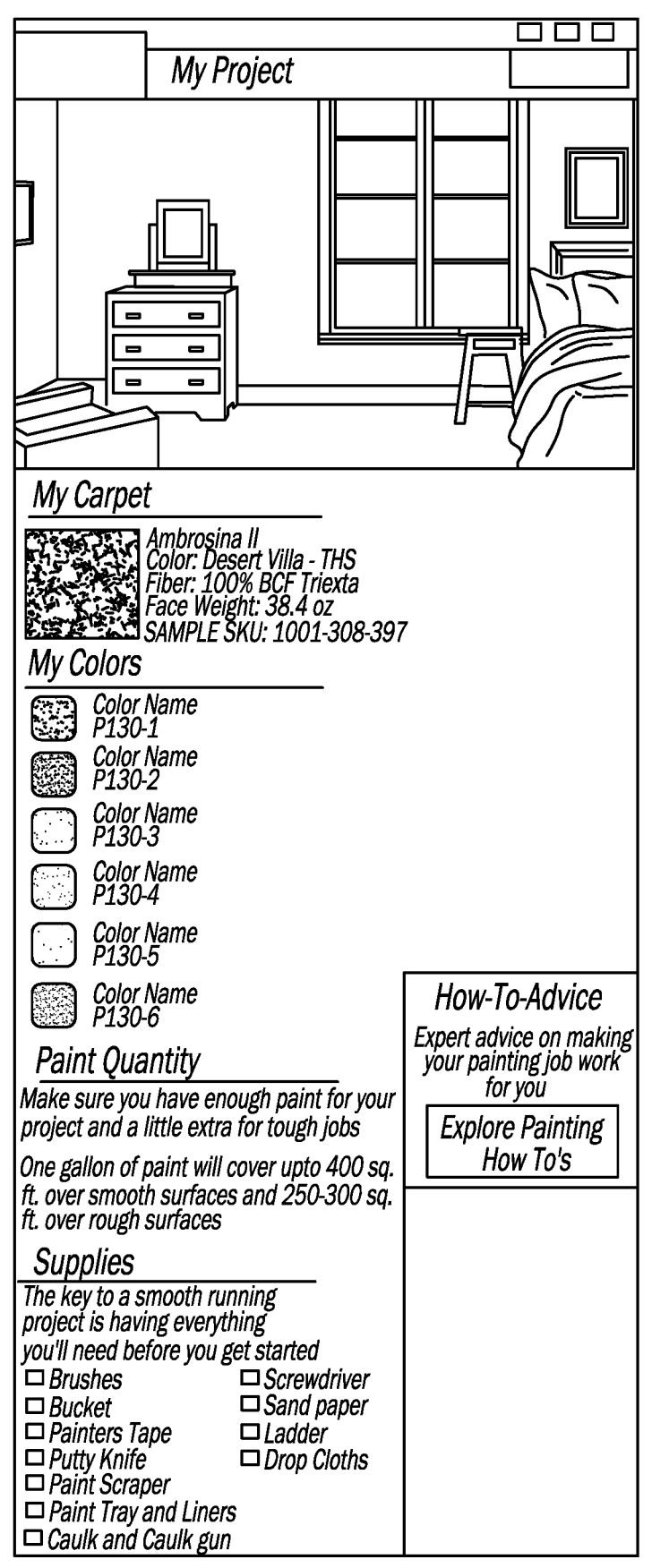

In addition, the example of FIG. 4 includes options for the user to share the particular project, including the sample room in the simulated environment, the selected sample product, and the corresponding matching or coordinating colors, via one of the sharing buttons 112. In the example of FIG. 4, the user can select an email icon or a mobile application icon to have the project emailed to an email address or saved/sent to a corresponding mobile device or mobile application. With reference to FIGS. 5A and 5B, screenshots of emails received corresponding to the project shown in FIG. 4 are displayed. For example, FIG. 5A shows a perspective view of an email displayed on a mobile device. FIG. 5B shows another view of the same screenshot of an email received in response to a user selected the email icon displayed in FIG. 4.

Figure 6:
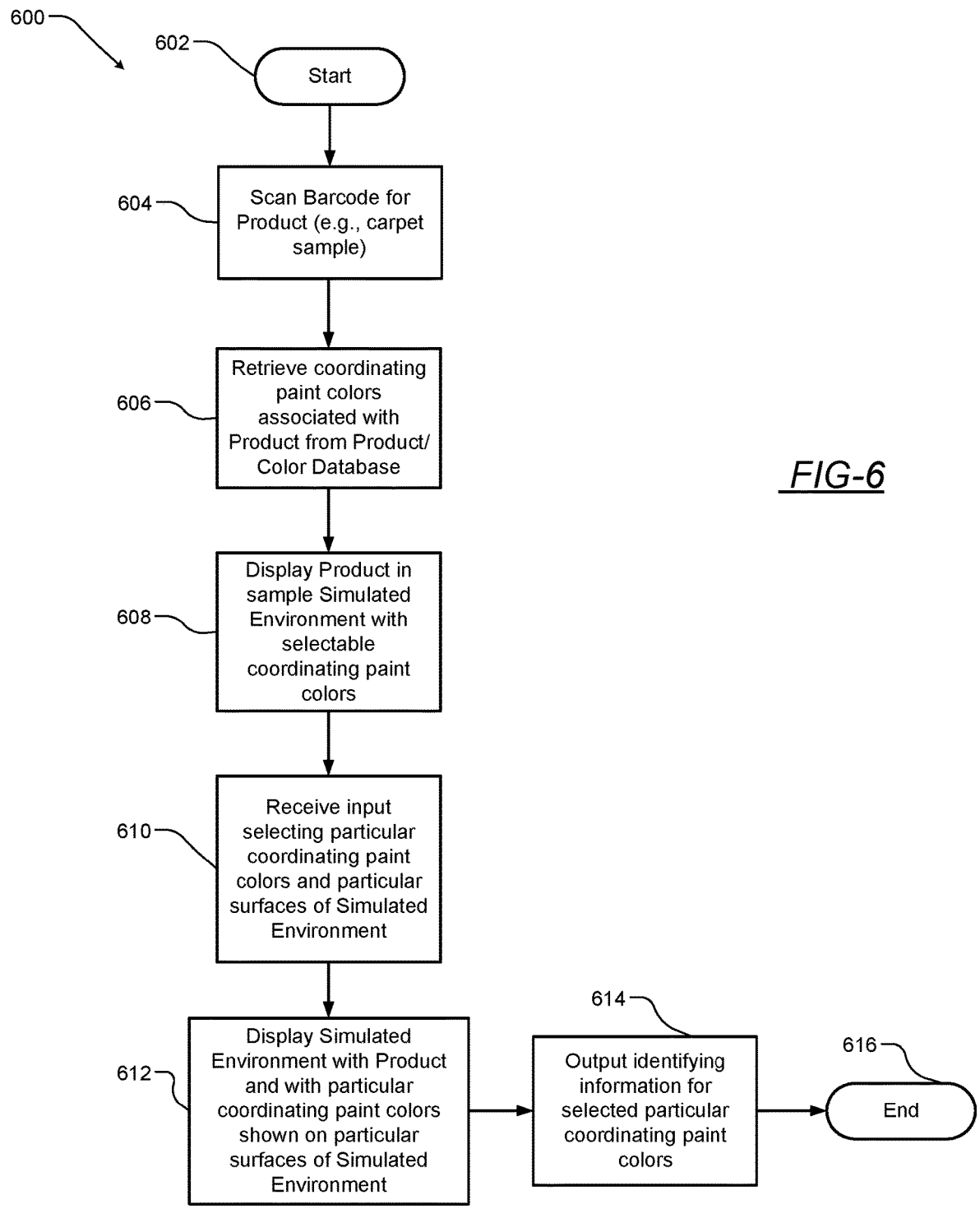
FIG. 6 is a flow chart for a color coordination method for scanned products according to the present disclosure.

With reference to FIG. 6, a flow chart for a color coordination method 600 for scanned products according to the present disclosure is illustrated. The method 600 can be executed by the control module 16 of the kiosk 12 shown in FIG. 1 and/or by the mobile device 60 shown in FIG. 2. The method 600 starts at 602. At 604, the machine-readable optical code, such as a barcode, for a sample product, such as a carpet sample, is scanned.

At 606, control module 16 or the mobile device 60 retrieves the preselected coordinating paint colors associated with the sample product scanned at step 604. For example, the control module 16 or the mobile device 60 can access the product/color database 18 stored at the kiosk 12, at the mobile device 60, and/or at the server 54, as discussed in detail above.

At 608, the control module 16 or the mobile device 60 displays the scanned product in a sample environment along with the preselected coordinating or matching paint colors on the touchscreen input/output device 14 of the kiosk 12 or the touchscreen input/output device 62 of the mobile device 60, as shown in FIG. 4.

At 610, the control module 16 or the mobile device 60 receives input from the touchscreen input/output device 14 of the kiosk 12 or the touchscreen input/output device 62 of the mobile device 60 selecting particular colors for display on particular surfaces of the simulated environment, as discussed above with reference to FIG. 4. At 612, the control module 16 or the mobile device 60 displays the simulated environment on the touchscreen input/output device 14 of the kiosk 12 or the touchscreen input/output device 62 of the mobile device 60, including a display of the sample room with the sample product and the selected coordinating or matching paint colors shown on particular selected surfaces, such as walls, trim, etc., of the sample room.

At 614, the control module 16 or the mobile device 60 outputs identifying information for selected particular coordinating paint colors. In this way, the user can utilize the identifying information to purchase the identified paint while in the retail store. In this way, the user can, in a single trip to the retail store, select and purchase a non-paint product, such as carpet, along with coordinating or matching paint colors for the non-paint product, such as the carpet.

The method 600 ends at 616.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the terms controller, control module, or module may be replaced with the term circuit. The terms controller, control module, or module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
a kiosk having a control module, an input device, a display device, and an optical code reader, and having access to a product/color database, the product/color database storing a plurality of entries, with each entry of the plurality of entries including information indicating a carpet product and a plurality of preselected coordinating paint colors for the carpet product;
the control module being configured to receive an identification code of a carpet sample scanned by the optical code reader, query the product/color database for the entry in the product/color database corresponding to the carpet product associated with the scanned identification code, retrieve the plurality of preselected coordinating paint colors for the carpet product from the corresponding entry in the product/color database for the carpet product associated with the scanned identification code, and display on the display device (i) a sample product section that includes an icon corresponding to the carpet product and a name of the carpet product, (ii) a color selection section that shows the plurality of preselected coordinating paint colors for the carpet product, (iii) a selected color section that shows a selected paint color from the plurality of preselected coordinating paint colors, a color name of the selected paint color, and a color identification number of the selected paint color, and (iv) a simulated environment including a sample room including carpeting corresponding to the carpet product and having a plurality of selectable surfaces including a wall of the sample room and a trim of the sample room, the control module being further configured to receive with the input device a first selected paint color from the plurality of preselected coordinating paint colors, to update the selected color section to show the first selected paint color, to receive with the input device a first selected surface from the plurality of selectable surfaces of the sample room, to update the simulated environment to display the first selected paint color on the first selected surface of the sample room with carpeting corresponding to the carpet product, to receive with the input device a second selected paint color from the plurality of preselected coordinating paint colors, to update the selected color section to display the second selected paint color, to receive with the input device a second selected surface from the plurality of selectable surfaces of the sample room, and to update the simulated environment to additionally display the second selected paint color on the second selected surface of the sample room with carpeting corresponding to the carpet product, the first selected surface being one of the wall of the sample room and the trim of the sample room and the second selected surface being the other of the wall of the sample room and the trim of the sample room.

2. The system of claim 1 wherein the identification code is one of a barcode and a QR code.

3. The system of claim 1 further comprising a touchscreen device that includes the input device and the display device.

4. A method comprising
receiving, with a control module of a kiosk, an identification code scanned by an optical code reader, the kiosk having access to a product/color database storing a plurality of entries, with each entry of the plurality of entries including information indicating a carpet product and a plurality of preselected coordinating paint colors for the carpet product;

querying the product/color database, with the control module, for the entry in the product/color database corresponding to the carpet product associated with the scanned identification code;

retrieving, with the control module, the plurality of preselected coordinating paint colors for the carpet product from the corresponding entry in the product/color database for the carpet product associated with the scanned identification code;

displaying, on a display device of the kiosk, a sample product section that includes an icon corresponding to the carpet product and a name of the carpet product;

displaying, on the display device of the kiosk, a color selection section that shows the plurality of preselected coordinating paint colors for the carpet product;

displaying, on the display device of the kiosk, a selected color section that shows a selected paint color from the plurality of preselected coordinating paint colors, a color name of the selected paint color, and a color identification number of the selected paint color;

displaying, on the display device of the kiosk, a simulated environment including a sample room including carpeting corresponding to the carpet product and having a plurality of selectable surfaces including a wall of the sample room and a trim of the sample room;

receiving, with an input device of the kiosk, a first selected paint color from the plurality of preselected coordinating paint colors;

updating, with the control module, the selected color section to show the first selected paint color;

receiving, with the input device of the kiosk, a first selected surface from the plurality of selectable surfaces of the sample room;

updating, with the control module, the simulated environment to display the first selected paint color on the first selected surface of the sample room with carpeting corresponding to the carpet product;

receiving, with the input device of the kiosk, a second selected paint color from the plurality of preselected coordinating paint colors;

updating, with the control module, the selected color section to display the second selected paint color;

receiving, with the input device, a second selected surface from the plurality of selectable surfaces of the sample room; and updating, with the control module, the simulated environment to additionally show the second selected paint color on the second selected surface of the sample room with carpeting corresponding to the carpet product;

wherein the first selected surface is one of the wall of the sample room and the trim of the sample room and the second selected surface is the other of the wall of the sample room and the trim of the sample room.

5. The method of claim 4 wherein the identification code is one of a barcode and a QR code.

6. The method of claim 4 wherein the input device and display device are integrated into a touchscreen device.

7. A system comprising:

a mobile device having a touchscreen and a camera and having access to a product/color database, the product/color database storing a plurality of entries, with each entry of the plurality of entries including information indicating a carpet product and a plurality of preselected coordinating paint colors for the carpet product;

the mobile device being configured to receive an identification code of a carpet sample scanned by the camera, query the product/color database for the entry in the product/color database corresponding to the carpet product associated with the scanned identification code, retrieve the plurality of preselected coordinating paint colors for the carpet product from the corresponding entry in the product/color database for the carpet product associated with the scanned identification code, and display on the touchscreen (i) a sample product section that includes an icon corresponding to the carpet product along and a name of the carpet product, (ii) a color selection section that shows the plurality of preselected coordinating paint colors for the carpet product, (iii) a selected color section that shows a selected paint color from the plurality of preselected coordinating paint colors, a color name of the selected paint color, and a color identification number of the selected paint color, and (iv) a simulated environment including a sample room including carpeting corresponding to the carpet product and having a plurality of selectable surfaces including a wall of the sample room and a trim of the sample room, the mobile device being further configured to receive with the touchscreen a first selected paint color from the plurality of preselected coordinating paint colors, to update the selected color section to show the first selected paint color, to receive with the touchscreen a first selected surface from the plurality of selectable surfaces of the sample room, to update the simulated environment to display the first selected paint color on the first selected surface of the sample room with carpeting corresponding to the carpet product, to receive with the touchscreen a second selected paint color from the plurality of preselected coordinating paint colors, to update the selected color section to display the second selected paint color, to receive with the touchscreen a second selected surface from the plurality of selectable surfaces of the sample room, and to update the simulated environment to additionally display the second selected paint color on the second selected surface of the sample room with carpeting corresponding to the carpet product, the first selected surface being one of the wall of the sample room and the trim of the sample room and the second selected surface being the other of the wall of the sample room and the trim of the sample room.

8. The system of claim 7 wherein the identification code is one of a barcode and a QR code.

9. The system of claim 7 wherein the mobile device is configured with a mobile application that includes the product/color database.

10. A method comprising:

receiving, with a mobile device having access to a product/color database, an identification code scanned by a camera of the mobile device, the product/color database storing a plurality of entries, with each entry of the plurality of entries including information indicating a carpet product and a plurality of preselected coordinating paint colors for the carpet product;

querying the product/color database, with the mobile device, for the entry in the product/color database corresponding to the carpet product associated with the scanned identification code;

retrieving, with the mobile device, the plurality of preselected coordinating paint colors for the carpet product from the corresponding entry in the product/color database for the carpet product associated with the scanned identification code;

displaying, on a touchscreen of the mobile device, a sample product section that includes an icon corresponding to the carpet product and a name of the carpet product;

displaying, on the touchscreen of the mobile device, a color selection section that shows the plurality of preselected coordinating paint colors for the carpet product;

displaying, on the touchscreen of the mobile device, a selected color section that shows a selected paint color from the plurality of preselected coordinating paint colors, a color name of the selected paint color, and a color identification number of the selected paint color;

displaying, on the touchscreen of the mobile device, a simulated environment including a sample room including carpeting corresponding to the carpet product and having a plurality of selectable surfaces including a wall of the sample room and a trim of the sample room;

receiving, with the touchscreen of the mobile device, a first selected paint color from the plurality of preselected coordinating paint colors;

updating, with the mobile device, the selected color section to show the first selected paint color;

receiving, with the touchscreen of the mobile device, a first selected surface from the plurality of selectable surfaces of the sample room;

updating, with the mobile device, the simulated environment to display the first selected paint color on the first selected surface of the sample room with carpeting corresponding to the carpet product;

receiving, with the touchscreen of the mobile device, a second selected paint color from the plurality of preselected coordinating paint colors;

updating, with the mobile device, the selected color section to display the second selected paint color;

receiving, with the touchscreen, a second selected surface from the plurality of selectable surfaces of the sample room; and updating, with the mobile device, the simulated environment to additionally show the second selected paint color on the second selected surface of the sample room with carpeting corresponding to the carpet product;

wherein the first selected surface is one of the wall of the sample room and the trim of the sample room and the second selected surface is the other of the wall of the sample room and the trim of the sample room.

11. The method of claim 10 wherein the identification code is one of a barcode and a QR code.

12. The method of claim 10 wherein the mobile device is configured with a mobile application that includes the product/color database.

\* \* \* \* \*